United States Patent Office 2,817,583
Patented Dec. 24, 1957

2,817,583

WORKING UP OF SULFIDIC RAW MATERIALS

Leo Schlecht, Ludwigshafen (Rhine), and Rudolf Staeger, Friedelsheim, Pfalz, Germany, assignors to Badische Anilin- & Soda-Fabrik Aktiengesellschaft, Ludwigshafen (Rhine), Germany No Drawing. Application May 10, 1956
Serial No. 583,932

6 Claims. (Cl. 75—7)

This invention relates to improvements in the processing of sulfidic raw materials.

For the working up of sulfidic raw materials which contain one or more of the metals copper, nickel, cobalt and zinc as well as iron, by sulfating roasting and leaching of the roasted material, it has already been proposed to mix with the air necessary for the roasting an amount of sulfur dioxide which is not sufficient for the formation of iron sulfate but only for the formation of the sulfates of the other metals. Thus the iron sulfide is roasted as far as possible to iron oxide, whereas the other metals are recovered as readily soluble sulfates. It has been found, however, that the speed of roasting of iron sulfide is considerably retarded by the sulfur dioxide content of the roasting air. Therefore attempts have already been made to effect preliminary roasting at temperatures of about 500° C. without the addition of sulfur dioxide to the roasting air, and then to effect further roasting with air containing sulfur dioxide at temperatures of about 700° C., in order to sulfatize the metals present in addition to iron, such as nickel, copper and cobalt. While it is true that in the preliminary roasting there is obtained a somewhat more rapid volatilization of the sulfide sulfur combined with iron than when roasting with air containing sulfur dioxide, the speed of roasting of the iron sulfide at 500° C. is still commercially unsatisfactory.

We have now found that the said disadvantages can be avoided by first subjecting the sulfidic raw material to a preliminary roasting without the addition of sulfur dioxide at temperatures considerably above 500° C., in particular between 600° and 800° C., preferably until an amount of sulfur has volatilized such as corresponds to the amount combined with iron, the roasted material then being further roasted with air containing sulfur dioxide preferably at temperatures between 500° and 700° C. In this way it is possible to convert the iron sulfide wholly or substantially into iron oxide in a very short time without the subsequent practically quantitative sulfating of the other metal sulfides being impaired.

The treatment with air containing sulfur dioxide should take place immediately following the preliminary roasting so that no appreciable cooling of the roasted material can occur. For this purpose an air current which contains the amount of sulfur dioxide adapted to the roasting temperature concerned can be led in for example in the neighborhood of the outlet of the roasted material from the roasting apparatus. When roasting in shelved ovens, this may be effected by introducing into the lower stories air containing sulfur dioxide which if desired is separately withdrawn before the air free from sulfur dioxide is introduced into the further stories situated above the same. A similar procedure may also be followed in rotary tubular ovens. When working according to the fluidized layer method, an air stream mixed with sulfur dioxide may be led into the roasted material in the neighborhood of its exit from the fluidized layer; a gas stream branched off from the effluent roaster gases can serve for this purpose. In many cases it is preferable, however, to carry out the roasting in the fluidized layer as otherwise usual, that is without the addition of sulfur dioxide, and to maintain rather high roasting temperatures, and then to lead the roasted materials, while still in the incandescent state, through an apparatus in which it passes in contact with air containing sulfur dioxide through the temperature range between 500° and 650° C. which is favorable for the formation of sulfates. For example the still incandescent roasted material from the roasting oven can be introduced into a rotary tube and the roaster gases coming from the roasting oven and containing sulfur dioxide, or a part of the same, led over the roasted material until this has cooled to about 500° C.

By the preliminary roasting without sulfur dioxide, the sulfur can be practically completely roasted off if during the subsequent roasting with gas containing sulfur dioxide the sulfates are reformed from the non-ferrous metal oxides. It is usually preferable, however, to remove during the preliminary roasting only such an amount of sulfur as is combined with iron, because then the formation of the non-ferrous metal sulfates proceeds more easily.

A specially simple method for the sulfating roasting with the aid of gases containing sulfur dioxide consists in carrying out the treatment with the gas containing sulfur dioxide in the same container in which the roasting off of the sulfur takes place. This can be achieved by leading the material being roasted, at least in the last phase of the roasting process, in co-current with the roaster gases (i. e. in the same direction) and by striving for the highest concentration of sulfur dioxide in the gas as far as possible at the point at which the roasted material is discharged, in contrast to the roasting processes hitherto usual in which the fresh material and the fresh air are moved in counter-current to each other, and in which therefore the most fully roasted material is brought into contact with fresh air and the fresh material is brought into contact with gases containing sulfur dioxide.

The said working in co-current can readily be carried out for example in a dust burner. In order to attain a sufficient sulfating of the non-ferrous metals, but no sulfating of the iron, the roasted material moved in co-current with the roaster gases should not be allowed to cool too much, but is separated from the gases containing sulfur dioxide for example at temperatures of 500° to 600° C. and then allowed to cool in the absence of sulfur dioxide. The said co-current method and the sulfating of the non-ferrous metals attained thereby can also be carried out in a fluidized layer, by introducing fresh material and fresh air into the lower part of the fluidized layer and supplying the roasted material to the outlet opening in the upper part in the presence of the roaster gas containing the maximum of sulfur dioxide.

Especially when carrying out the process in co-current it can be advantageous to use oxygen or air enriched with oxygen instead of air. The higher oxygen partial pressure thus attained in the roaster gas and the higher sulfur dioxide concentration thereby rendered possible has a favorable effect, however, in all the methods of carrying out the present invention, especially when it is desired to recover not only copper sulfate, but also nickel, cobalt and other sulfates which dissociate at high temperature.

The sulfates of the non-ferrous metals can be extensively leached out from the roasted material with water. In many cases, however, dilute sulfuric acid or ammoniacal ammonium salt solutions are to be preferred in order to shorten the duration of the leaching and to avoid the formation of basic sulfates and to obtain a valuable iron oxide residue as free as possible from non-ferrous metals. In particular the ammoniacal liquors can be more readily worked up to the individual metals contained therein than the solutions obtained by aqueous or acid leaching which usually are contaminated with iron which has passed into solution. The iron oxide residue obtained by leaching may be exploited with advantage for the recovery of metallic iron.

The following examples will further illustrate this invention but the invention is not restricted to these examples.

*Example 1*

Copper-containing iron pyrites with 4.8% of copper is roasted at 800° C. with air until the sulfur content is reduced to about 1%. From this iron pyrites about three times as much sulfur is volatilized in the form of sulfur dioxide at 800° C. than at 500° C. Over the roasted product obtained at 800° C., roaster gases containing air and about 8 to 10% of sulfur dioxide are led while it cools slowly to 600° C. The material is then allowed to cool further in the air. By leaching with water, 99% or more of the copper from this sulfated roasted product passes into solution. The remaining iron oxide residue contains only 0.1% of copper.

If the iron pyrites is not first roasted with air as above described, but is treated from the start only with air containing sulfur dioxide at 600° C., then in spite of a roasting duration of more than twice the length, only 94% of copper passes into solution by leaching and the iron oxide residue still contains 0.4% of copper.

*Example 2*

Into the top end of a rotary tubular oven there is continuously introduced iron pyrites containing 4.8% of copper, and air is introduced at the same end. The material being roasted and the roaster gases thus pass through the oven in co-current. The roasting temperature in the front part of the oven is kept between 700° and 800° C. and in the rear part at 600° to 650° C. The roasted material is discharged at the rear end of the oven and allowed to cool in the air. The roaster gas, in which by regulation of the supply of air a sulfur dioxide content of 8 to 10% by volume is maintained, is also withdrawn at the end of the oven from the hot roasted product which is at a temperature of at least 600° C. The cooled roasted material is leached with hot water, practically the whole of the copper thus passing into solution as copper sulfate. The remaining iron oxide residue contains only 0.05% of copper.

What we claim is:

1. In the processing of sulfidic raw materials containing iron and at least one of the metals copper, nickel, cobalt and zinc by roasting and leaching, the improvement which comprises first subjecting the sulfidic raw material to a preliminary roasting in a first stage without the addition of sulfur dioxide at temperatures between 600° and 800° C. until an amount of sulfur has been volatilized such as corresponds to the amount combined with iron, and then further roasting the material in a second stage with air containing sulfur dioxide as the only sulfating agent at temperatures between 500° and 700° C.

2. A process as claimed in claim 1 wherein the preliminary roasting in the first stage is carried out with oxygen-enriched air to provide a roasting gas in the second stage containing from 8 to 10% by volume of sulfur dioxide.

3. A process as claimed in claim 1 wherein the roasting gas in at least the second stage is supplied in co-current flow with the material being roasted.

4. A process as claimed in claim 3 wherein the roasting gas in the second stage contains from 8 to 10% by volume of sulfur dioxide.

5. In the processing of sulfidic raw materials containing iron and at least one of the metals copper, nickel, cobalt and zinc by roasting and leaching, the improvement which comprises introducing both the sulfidic raw material and roasting air for co-current flow through two stages of a roasting apparatus such that the effluent roasting gas containing sulfur dioxide from the first stage passes to the second stage, maintaining the initial temperature in said first stage between 700° C. and 800° C. to volatilize an amount of sulfur in the first stage corresponding to the amount combined with iron, maintaining the final temperature in the second stage at 600° C. to 650° C. to convert said metals other than iron into their sulfates with sulfur dioxide as the only sulfating agent in the second stage, and maintaining a sulfur dioxide content of 8 to 10% by volume of the effluent roasting gas from the second stage by regulation of the supply of roasting air introduced into the first stage.

6. A process as claimed in claim 5 wherein the roasting air introduced to the first stage is enriched with oxygen.

References Cited in the file of this patent

UNITED STATES PATENTS

| | | |
|---|---|---|
| 1,657,711 | Coolbaugh et al. | Jan. 31, 1928 |
| 2,719,082 | Sproule et al. | Sept. 27, 1955 |